United States Patent
Suzuki et al.

(10) Patent No.: US 7,609,340 B2
(45) Date of Patent: Oct. 27, 2009

(54) LIQUID CRYSTAL DISPLAY CELL

(75) Inventors: Daiichi Suzuki, Ishikawa-gun (JP);
Kazuhiro Nishiyama, Kanazawa (JP);
Mitsutaka Okita, Mattou (JP);
Shigesumi Araki, Ishikawa-gun (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 88 days.

(21) Appl. No.: 10/577,045

(22) PCT Filed: Oct. 21, 2004

(86) PCT No.: PCT/JP2004/015585

§ 371 (c)(1),
(2), (4) Date: Dec. 12, 2006

(87) PCT Pub. No.: WO2005/038520

PCT Pub. Date: Apr. 28, 2005

(65) Prior Publication Data

US 2007/0132920 A1    Jun. 14, 2007

(30) Foreign Application Priority Data

Oct. 22, 2003   (JP)   ............... 2003-362344

(51) Int. Cl.
*G02F 1/1335*   (2006.01)
(52) U.S. Cl. .................... 349/108; 349/106
(58) Field of Classification Search ........... 349/106, 349/108
See application file for complete search history.

(56) References Cited

U.S. PATENT DOCUMENTS 6,665,032 B1 *  12/2003  Kikkawa ............... 349/117
2003/0011732 A1 *  1/2003  Ishihara et al. ........ 349/117

FOREIGN PATENT DOCUMENTS

| JP | 7-168173 | | 7/1995 |
|---|---|---|---|
| JP | 8-122803 | | 5/1996 |
| JP | 08-122803 A | * | 5/1996 |
| JP | 10-197862 | | 7/1998 |
| JP | 2003-140194 | | 5/2003 |
| JP | 2003-195277 | | 7/2003 |

OTHER PUBLICATIONS

U.S. Appl. No. 10/577,059, filed Apr. 24, 2006, Okita, et al.
U.S. Appl. No. 10/582,237, filed Jun. 9, 2006, Araki, et al.

* cited by examiner

*Primary Examiner*—Uyen Chau N Le
*Assistant Examiner*—Rhonda S Peace
(74) *Attorney, Agent, or Firm*—Oblon, Spivak, McClelland, Maier & Neustadt, L.L.P.

(57) ABSTRACT

To reduce the blue tone in the black display of the OCB liquid crystal display device. A liquid crystal display cell (11) includes: an opposing substrate (130) having an opposing electrode (Ecom); an array substrate (120) having a pixel electrode Dpix for each color; a liquid crystal layer (140) arranged in a bend arrangement located between the opposing substrate (120) and the array substrate (120); and red, green, and blue filter layers arranged on one of the substrates. The opposing electrode has a film thickness tB of the portion Ecom (B) corresponding to the blue filter layer, which thickness is set so as to have the minimum value in the range 380 nm to 480 nm in the spectrum of the front reflectance and satisfy the following: 100 nm<tB≦140 nm.

7 Claims, 13 Drawing Sheets

(a)

(b)

LIQUID CRYSTAL DISPLAY CELL

TECHNICAL FIELD

The present invention relates to a liquid crystal display device, and more particularly to a liquid crystal display device employing the optically compensated birefringence (OCB) technology enabling realization of a wide viewing angle and high speed response.

TECHNICAL BACKGROUND

Liquid crystal display devices are put in practical use in various application fields with taking advantage of the characteristics thereof such as lightweight, a thin outline, and less power consumption.

Twisted nematic (TN) type liquid crystal display devices now widely utilized in the market have a structure in which liquid crystal material thereof having optically positive refractive index anisotropy is arranged between the substrates in such a manner as to be twisted by approximately 90 degrees, so that optical rotatory property of the incident light is regulated upon controlling the twisted alignment. Although the TN type liquid crystal display device can be manufactured comparatively easily, it is not suitable to display moving pictures such as TV images because the viewing angle is narrow and the response speed is slow.

For improving the viewing angle and the response speed, on the other hand, the OCB type liquid crystal display device has been focused on. The OCB type liquid crystal display device, which has a liquid crystal material capable of forming bend alignment sealed between the substrates, has some advantages that the response speed can be improved by one digit in comparison with the TN type liquid crystal display device and furthermore the viewing angle can be widened because it is optically self-compensated thanks to the alignment condition of the liquid crystal material. When image display is carried out with use of the OCB type liquid crystal display device, it is considered upon controlling birefringence and combining with a polarization plate that the light is shut off (the black display) in the condition where a higher voltage is applied thereto, or passes therethrough (the white display) in the condition where a lower voltage is applied thereto.

Though liquid crystal molecules are arranged along the direction of the electric field by applying a higher voltage in the black display condition, liquid crystal molecules in the vicinity of the substrate are not arranged in the normal direction to the substrate due to the interaction with the alignment layer, so that the light is affected by the phase difference in the specified direction. As a result, when observation is carried out from the direction normal to the substrate (the front direction of the display screen), the transmittance in the black display condition cannot be sufficiently decreased, so that the above phenomenon gives rise to deterioration of the contrast. It is known that phase difference of the liquid crystal layer in the black display can be compensated and the transmittance can be sufficiently decreased by combining with, for example, a mono axial phase difference plate. Additionally, as disclosed, for example, in the Patent Document 1, combining with a hybrid arranged optically negative phase difference plate is known as a measure to compensate sufficiently the black display or gray scale characteristics for the observation in the front direction and moreover the oblique direction. Furthermore, the Patent Document 2 has disclosed that the thickness of the electrode is set to be 80 nm to 100 nm to improve the transmittance in the short wavelength side (380 nm to 480 nm) for the general TN type liquid crystal display device.

Patent Document 1: Japanese Laid-open Patent Publication Hei10-197862

Patent Document 2: Japanese Laid-open Patent Publication 2003-195277

DISCLOSURE OF THE INVENTION

Problems to be Solved by the Invention

The color liquid crystal display device forms an image with an incident light such as the natural light or a back light with high color rendering reflected or transmitted through each color filter layer, wherein lights spreading over the whole light wavelength region are selected by the wavelength pass band of each filter layer.

As the optical rotatory property is utilized for display in the TN type liquid crystal display device, internal reflection of the light between the substrates has little effect on the display. However in the OCB liquid crystal display device, retardation of the incident light passing through the liquid crystal layer disagrees with retardation of the phase difference plate due to the number of times of the internal reflection. This causes a problem that the balance of color is disrupted. Moreover, because the internally reflected light also has wavelength dispersion, disruption of the balance of color gets more and more increased. Especially, the blue filter CF(B) is set to pass the region from 400 to 550 nm. That is to say, because the sharp peak of 435 nm, the low and broad peak of 450 nm, and the low and broad peak of 490 nm of the emission spectrum of the lamp are included in the passing region of the blue filter CF(B), the image is liable to be tinged with blue in the black display. In the Patent Document 2, the thickness of the electrode is set to be 80 nm to 100 nm in order that the transmittance of the blue region (380 to 480 nm) becomes the maximum. However it has been revealed that occurrence of the tinge of blue in the black display cannot be sufficiently suppressed even though this thickness of the electrode is applied to the OCB structure.

The present invention is intended to provide a liquid crystal display device that has a high response speed and an excellent the balance of color.

Means to Solve the Problems

The present invention adjusts the color balance upon reducing the cell internal reflection of the light component, especially blue component passing through the liquid crystal display cell and attenuating undesirable light leaking from the blue filter. Namely, the thickness of the transparent opposing electrode located on the opposing substrate in the liquid crystal display cell is set so that the front reflectance can become the minimum for the light of the range from 380 nm to 480 nm. If the thickness of the portion corresponding to the blue filter layer of the opposing electrode is represented by tB, it is confined to $$100\ \mathrm{nm} < tB \leq 140\ \mathrm{nm}.$$

It is desirable that the color filter is located between the opposing substrate and the opposing electrode.

Furthermore the present invention provides a liquid crystal display cell comprising:

an array substrate having a plurality of pixel electrodes and switching components connected to each pixel electrode arranged in matrix form on a main surface thereof;

an opposing substrate having an opposing electrode located so as to face the array substrate with a gap between them;

a color filter comprising red, green and blue filter layers formed corresponding to the pixel electrodes on one of the substrates; and a liquid crystal layer arranged in a bend alignment interposed between the array substrate and the opposing substrate, wherein minimum value in spectrum of front reflectance of a portion of the opposing electrode corresponding to the blue filter layer is between 380 nm and 480 nm, and thickness of a portion of the opposing electrode corresponding to the red and green filter layers is thicker than thickness of the blue filter layer.

It is desirable that the following:

$ntB < ntG \leq ntR$ can be satisfied, where n denotes the refractive index of the opposing electrode; tB denotes the thickness of the portion of the opposing electrode corresponding to the blue filter layer; tG denotes the thickness of the portion of the opposing electrode corresponding to the green filter layer; and tR denotes the thickness of the portion of the opposing electrode corresponding to the red filter layer.

Furthermore, it is preferred that the followings:

$190\ nm < ntB < 240\ nm,$ $250\ nm < ntG < 280\ nm,$ and $290\ nm < ntR < 350\ nm$ can be satisfied, where n denotes the refractive index of the opposing electrode; tB denotes the thickness of the portion of the opposing electrode corresponding to the blue filter layer; tG denotes the thickness of the portion of the opposing electrode corresponding to the green filter layer; and tR denotes the thickness of the portion of the opposing electrode corresponding to the red filter layer.

Moreover, it is preferable that the opposing electrode is formed by indium tin oxide (ITO) film.

In addition, it is desirable that the liquid crystal display cell comprises a phase difference plate located on at least one of main surfaces of the liquid crystal display cell, and a polarization plate located on at least one of main surfaces of the liquid crystal display cell so as to interpose the phase difference plate between the polarization plate and the liquid crystal display cell.

An embodiment of the OCB mode liquid crystal display cell has a structure which comprises a matrix wiring, a TFT switching element, an insulation film between layers, pixel electrodes and the alignment layer, all of the above being superimposed in a multilayer on the array substrate, and color filters, a black matrix (BM), the opposing electrode and the alignment layer, all of the above being superimposed in a multilayer on the opposing substrate. While a light passes through the cell, it is affected by internal reflection and internal scattering due to each layer and light dispersion due to the liquid crystal layer.

Because the OCB mode cell is combined with the phase difference plate in order to control the phase of the polarized light by varying the summation of the retardation of the phase difference plate and the retardation of the liquid crystal layer upon controlling the birefringence index of the liquid crystal layer, i.e. the retardation of the liquid crystal layer, one of the key factors thereof is that the thickness of the liquid crystal layer is uniform. When retardation of the liquid crystal layer is denoted by RD, it is represented by $RD = (nz - nx)d,$ where nx is the refractive index in the direction of orientation normal to the surface of the liquid crystal layer, i.e. z axis; nx is the refractive index in the directions of x, y axes in the surface of the liquid crystal layer; and d is the thickness of the liquid crystal layer.

When the retardation of the phase difference plate is represented by RD(WV) and the retardation of the liquid crystal layer in the black display is represented by RD0, the retardation of the entire device in the black display is $RD(WV) + RD0 = 0.$ FIG. 14 shows main elements of the liquid crystal display cell, i.e. the array substrate GLS1, the pixel electrode Dpix, the liquid crystal layer 140 with thickness d, the opposing electrode Ecom, the color filter CF, and the opposing substrate GLS2. Although the light L1 having passed the cell through without reflection is controlled in accordance with the equation mentioned above, the light L2 having passed through after reflected once in the liquid crystal layer 140 passes three times through the liquid crystal layer 140. The retardation of this case is therefore $RD(WV) + 3RD0 \neq 0,$ that is to say, it is not zero, so that the light is out of control.

The light emitted from the filter CF after reflected repeatedly like the above is off the retardation compensation, and raises the black brightness in the black display, then causes occurrence of a tinge of special color in the black. In particular, the blue filter CF(B) is set to pass the region from 400 to 550 nm. That is to say, because the sharp peak of 435 nm, the low and broad peak of 450 nm, and the low and broad peak of 490 nm in the emission spectrum of the lamp are included in the passing region of the blue filter CF(B), a light having a wavelength out of control can easily pass through, so that the tinge of blue is frequently generated in the image.

Focused on the electrode film, the present invention is intended to reduce the internal reflection in the liquid crystal layer by placing the minimum value of the front reflectance of at least a portion of the electrode film in the blue region of 380 to 480 nm of the spectrum. The front reflectance here is defined as the reflectance when the light is incident on the film surface from the vertical direction thereof.

EFFECTS OF THE INVENTION

The present invention diminishes the internal reflection of at least blue light component by making the front reflectance of the opposing electrode of the liquid crystal display cell be the minimum value at the spectral range of 380 nm to 480 nm, so that retardation control of the blue light can be facilitated. Moreover, the blue light is prevented from leaking, and the tinge of blue in the image generated in the black display can be canceled.

PREFERRED EMBODIMENTS TO IMPLEMENT THE INVENTION

Referring to the drawings, a liquid crystal display device as an embodiment of the present invention will be explained hereinafter.

Embodiment 1

FIG. 1 shows a schematic block diagram of the liquid crystal display device according to the OCB mode system of the embodiment.

The liquid crystal display device 1 having the aspect ratio of 16:9 and the diagonal of 22 inches comprises a liquid crystal display panel 100 of light transmission active matrix type, a backlight 300 constituted of a plurality of tubular light sources 310 arranged in parallel together (Refer to FIG. 11) and located at the back of the liquid crystal display panel, scanning line drive circuits Ydr1, Ydr2 (Refer to FIG. 4) accommodated in the liquid crystal display panel 100 and supplying a scan signal Vg to a scanning line Yj, a signal line drive circuit 500 comprised of TCP (Tape Carrier Package) supplying a signal voltage Vsig to a signal line Xi (Refer to FIG. 4), an opposing electrode drive circuit 700 supplying an opposing electrode voltage Vcom to an opposing electrode Ecom (Refer to FIG. 2), and a control circuit 900 controlling the scanning line drive circuits Ydr1, Ydr2, the signal line drive circuit 500 and the opposing electrode drive circuit 700. The liquid crystal display panel 100 is interposed by a backlight 300 and a frame-like bezel 1000.

As shown in FIG. 3, the liquid crystal display panel 100 comprises a liquid crystal display cell 110, a front hybrid phase difference plate 200a, a front double-axial phase difference plate 210a, a front polarization plate 220a, a rear hybrid phase difference plate 200b, a rear double-axial phase difference plate 210b and a rear polarization plate 220b. The front hybrid phase difference plate 200a, the front double-axial phase difference plate 210a and the front polarization plate 220a are integrally composed, and the rear hybrid phase difference plate 200b, the rear double-axial phase difference plate 210b and the rear polarization plate 220b are also integrally composed, and then they are stuck on both the main surfaces of the liquid crystal display cell 110.

As shown in FIG. 2, the liquid crystal display cell 110 is composed of an array substrate 120 having pixel electrodes for display Dpix, an opposing substrate 130 having an opposing electrode Ecom located facing the pixel electrodes for display Dpix on the array substrate, an alignment layers 151, 153 coated on the electrodes Dpix, Ecom between the array substrate 120 and an opposing substrate 130, and a liquid crystal layer 140 interposed via the alignment layers. A color filter CF comprising a blue filter layer CF (B), a green filter layer CF(G) and a red filter layer CF(R), and a light shield layer BM are further provided on the opposing substrate 130. As is described later, the thickness of the opposing electrode Ecom at the position corresponding to each color filter layer is set to be different from each other for each color of the filter layer. That is to say, when the thickness corresponding to the blue filter layer is represented by tB; the thickness corresponding to the green filter layer is represented by tG; and the thickness corresponding to the red filter layer is represented by tR, then $tB < tG \leq tR$ is satisfied.

<Structure of the Array Substrate>

Referring to FIG. 2 to FIG. 10, the array substrate 120 will be explained.

The array substrate 120 has a transparent glass substrate GLS1 on which a plurality of signal lines Xi formed by aluminum (Al) and a plurality of scanning lines Yj formed by molybdenum-tungsten alloy (MoW) are arranged in a matrix form via an inter-layer insulator film INS2 of a silicon oxide ($SiO_2$) film. Additionally, auxiliary capacitance lines Cj prepared in the same process as the scanning lines Yj are located in parallel with the scanning lines Yj.

In the vicinity of the intersection of the signal line Xi and the scanning line Yj, a pixel electrode for display Dpix formed by ITO (Indium Tin Oxide) as a transparent electrode is located on a thin film transistor TFT of the top gate structure having a polycrystalline silicon (p-Si) as an active layer via a passivation film INS3 for the switching element. In more detail, this TFT is formed in the double gate structure so as to diminish the off-leak current, and has P type source-drain regions p-Si(s), p-Si(d), channel regions p-Si(c1), p-Si(c2) and a connecting region p-Si(i) placed between the channel region p-Si(c1) and p-Si(c2) in the p-Si film. The drain region p-Si(d) is connected with the signal line Xi through a contact hole CH1. The source region p-Si(s) is pulled about by a source line EXT of Al through a contact hole CH2 and connected with the pixel electrode for display Dpix through a contact hole CH3.

On the p-Si film, a gate insulation film INS1 of TEOS is located. Furthermore, a first gate electrode G1 extended from the scanning line Yj is positioned and a part of the scanning line Yj is wired as a second gate electrode G2 on the gate insulation film. The first gate electrode G1 corresponds to the first channel region p-Si(c1), and the second gate electrode G2 corresponds to the second channel region p-Si(c2).

The source region p-Si (s) of the TFT includes a source region extended portion p-Si(se) (FIG. 6), and is electrically connected through a contact hole CH4 with a second auxiliary capacitance electrode EC2, which is located on a first auxiliary capacitance electrode EC1 of MoW extended from the auxiliary capacitance line Cj and prepared in the same process as the auxiliary capacitance line Cj, via an inter-layer insulation film INS2. The second auxiliary capacitance electrode EC2 is constituted of Al formed in the same process as the signal line Xi. Furthermore, on the second auxiliary capacitance electrode FC2, a pixel electrode for phase transition Tpix formed in the same process as the pixel electrode for display Dpix is positioned through a passivation film INS3, and the pixel electrode for phase transition Tpix is electrically connected with the second auxiliary capacitance electrode EC2 via a contact hole CH5.

According to the structure mentioned above, a holding capacitance Cs (FIG. 4) is formed between the first auxiliary capacitance electrode EC1 and the second auxiliary capacitance electrode EC2. Because the pixel electrode for phase transition Tpix is located on the holding capacitance Cs, a large holding capacitance Cs can be effectively assured without decreasing the aperture ratio.

Moreover, in this embodiment, because the pixel electrode for display Dpix and the pixel electrode for transition Tpix are located straddling the scanning line Yj and connected together through the source region extended portion p-Si(se) independent of the source region p-Si (s) of the TFT, remedy can easily be executed upon disconnecting electrically the source region extended portion p-Si (se) by means of e.g. laser radiation even if the holding capacitance Cs is shorted.

The pixel electrode for display Dpix of the neighboring horizontal line and the pixel electrode for phase-transition, which are adjacent to each other on the auxiliary capacitance line Cj, are structured like a comb-teeth shape which has opposing edge sides thereof being engaged with each other. This structure can form uniformly a core of bend upon supplying a twisted transversal electric field between the pixel electrode for display Dpix and the pixel electrode for phase transition Tpix, so that the initial spray alignment condition can be uniformly led to the bend alignment condition. The comb-teeth pitch can lead to a uniform alignment at a low voltage by, for example, the pitch being smaller than 50 μm.

As shown in FIG. 4, both ends of the scanning line Yj are electrically connected with scanning line drive circuits Ydr1, Ydr2 integrally constituted on the glass substrate GLS1 respectively. A vertical scanning clock signal YCK and a vertical start signal YST are inputted to the scanning line drive circuits Ydr1 and Ydr2 respectively. The both ends of the auxiliary capacitance line Cj are connected to the connecting line Ccs so as to input the auxiliary capacitance voltage Vcs through the connecting line Ccs. The signal line Xi is connected to a signal input line xk (k=i/2) via a select switch SEL. In detail, the signal lines Xi are divided into odd number signal lines Xi (i=1, 3, 5, . . . ) and even number signal lines Xi (i=2, 4, 6, . . . ), and a pair of neighboring odd number signal lines Xi, Xi+2 are connected to the same signal input line xk through select switches SEL1, SEL3, and a pair of neighboring even number signal lines Xi+1, Xi+3 are connected to the same signal input line xk+1 through select switches SEL2, SEL4. Wiring is carried out so as to satisfy following conditions: The select switch SEL1 connected to one of the odd number signal line pairs and the select switch SEL4 connected to one of the even number signal line pairs are selected by a first select signal Vsel1; and the select switch SEL3 connected to the other of the odd number signal line pairs and the select switch SEL2 connected to the other of the even number signal line pairs are selected by a second select signal Vsel2.

As shown in FIG. 8(a), for example, a signal voltage Vsig1 positive (+) to an opposing electrode voltage Vcom is written to the pixel electrode for display Dpix corresponding to the signal line X1, and a signal voltage Vsig4 negative (−) to the opposing electrode voltage Vcom is written to the pixel electrode for display Dpix corresponding to the signal line X4 in the first half of one horizontal scanning period (1H) of e.g. the first scanning line Y1. A signal voltage Vsig2 negative (−) to an opposing electrode voltage Vcom is written to the pixel electrode for display Dpix corresponding to the signal line X2, and a signal voltage Vsig3 positive (+) to the opposing electrode voltage Vcom is written to the pixel electrode for display Dpix corresponding to the signal line X3 in the latter half of one horizontal scanning period (1H) of the first scanning line Y1. As shown in FIG. 8(b), a signal voltage Vsig1 negative (−) to an opposing electrode voltage Vcom is written to the pixel electrode for display Dpix corresponding to the signal line X1, and a signal voltage Vsig4 positive (+) to the opposing electrode voltage Vcom is written to the pixel electrode for display Dpix corresponding to the signal line X4 in the first half of one horizontal scanning period (1H) of the next frame. A signal voltage Vsig2 positive (+) to an opposing electrode voltage Vcom is written to the pixel electrode for display Dpix corresponding to the signal line X2, and a signal voltage Vsig3 negative (−) to the opposing electrode voltage Vcom is written to the pixel electrode for display Dpix corresponding to the signal line X3 in the latter half of one horizontal scanning period (1H).

As mentioned above, frame inversion driving and dot inversion driving are carried out. Thereby, undesirable supply of DC voltage can be prevented and also occurrence of flicker can be effectively prevented. In addition, because number of connections between the signal line drive circuit 500 and the liquid crystal display panel 100 decreases to a half the number i of the signal lines Xi, connecting process thereof can be largely reduced and improvement of production yield, progress in anti-shock characteristic, etc. can be achieved thanks to a less number of connection. Furthermore, limitations of connection pitch accompanied by progress toward the high definition can be broadened. For example, high definition of less than 80 μm can be achieved.

In the embodiment described above, though the signal voltage Vsig inputted from a signal input line xk in one horizontal scanning period (1H) is serially divided into every other two signal lines Xi, Xi+2, it can be divided into three signal lines or four signal lines. Thereby, number of connection can be further decreased. However, increase in the number of dividing results in reduction of the writing time, so that it should be designed in accordance with the ability, etc. of the TFT.

<Structure of the Opposing Substrate>

The opposing substrate 130 is constituted of a matrix-formed shielding film BM interrupting undesirable leak-lights, filter layers CF(R), CF(G), CF(B) of red R, green G, and blue B provided so as to correspond to each of pixel electrodes Dpix for color display, and a transparent opposing electrode Ecom of indium tin oxide film ITO, on a glass substrate GLS2. CF(R), CF(G), CF(B) are arranged adjacently in order.

Post spacers of resin (not shown in the figure) are arranged on the opposing electrode Ecom in order to maintain the gap to the array substrate 110. The spacers are arranged regularly at a rate of one to a plurality of pixels. The position corresponding to the spacer on the array substrate is a broad area Xa on the signal line shown in FIG. 5.

As shown in FIG. 2, the opposing electrode Ecom has different thicknesses corresponding to the colors of neighboring filter layers. In this embodiment, the thicknesses tB, tG, and tR have the relation among them represented by $$tB<tG<tR,$$

and are set to be $$190\ nm<ntB<240\ nm,$$

$$250\ nm<ntG<280\ nm\ and$$

$$290\ nm<ntR<350\ nm$$

respectively, where n denotes the refractive index of the film.

Thereby, the thickness tB of the opposing electrode Ecom corresponding to the blue filter layer is so set that the minimum value of the front reflectance can be in the blue range from 380 nm to 480 nm of the spectrum. Moreover, the thickness tG corresponding to the green filter layer is so set that the minimum value can be in the range from 500 nm to 560 nm. Furthermore, the thickness tB corresponding to the red filter layer is so set that the minimum value can be in the range from 580 nm to 700 nm. In addition, if the region of the thicknesses of the opposing electrode corresponding to the green and red filters are not limited to the above but have a room, the thickness tB of the opposing electrode Ecom corresponding to the blue filter layer is preferably selected to be $100\ nm<tB\leq140\ nm$.

In consequence, the thickness of the opposing electrode under each color filter is a value which can minimize the reflection to each color. As a result, multi internal reflection of the light incident on the liquid crystal layer can be reduced and leaking light can also be reduced. Therefore, rising of the black brightness and a tinge of color in the black display can be suppressed.

In particular, when the black display tinged with blue is observed, it is necessary that the front reflectance of the opposing electrode Ecom(B) corresponding to the blue filter layer should be the minimum in the spectral range of 380 to 480 nm. The curve A of FIG. 15 is the characteristic when the minimum reflectance of Ecom(B) is set at 440 nm. It shows that the reflectance of the blue region is reduced in comparison with the characteristic B which has the minimum value set at the center of the visible light spectrum, i.e. approximately 450 nm.

Because the refractive index of each portion of the liquid crystal display cell is as follows: the glass substrate is 1.5; the ITO electrode film is 1.9 to 2.0; the liquid crystal layer, the alignment layer, the other layers are approximately 1.5 to 1.8, the refractive index of the ITO electrode film is large so that it affects largely to light reflection. Upon reducing the reflectance of the opposing electrode according to the present invention, reflection in the liquid crystal layer can be remarkably reduced. The thickness tB of the opposing electrode Ecom(B) corresponding to the blue filter to obtain the minimum reflectance at the spectrum of 440 nm is 116 nm when the opposing electrode film is formed by ITO.

When the image is tinged with blue in the black display, the thicknesses of the opposing electrode corresponding to the other color filters can be the same for green and red if the thickness tB is set to be like the above. Though electric resistance increases and electric current supplying ability decreases upon reducing the thickness of the opposing electrode Ecom, there is an advantage that a film having an allowance to the current supply can be obtained by making the thicknesses of the portions corresponding to the green and red filters thicker.

<Structure of the Liquid Crystal Display Panel>

The structure of the liquid crystal display panel 100 will be explained next in more detail.

As shown in FIG. 3, rubbing process is executed on alignment layers 151 and 153 positioned on the respective main surfaces of the opposing substrates 120 and 130, in such a manner that rubbing directions Ra and Rb (Refer to FIG. 9 and FIG. 10) are vertically in approximately parallel together and in the same direction on the substrates 120 and 130. Pre-tilt angle (θ) is set to be approximately 10 degrees. The liquid crystal layer 140 is interposed by both the substrates 120 and 130. Positive dielectric constant anisotropic p-type nematic liquid crystal whose molecules take the bend alignment when a predetermined voltage is supplied to the pixel electrode for display Dpix and the opposing electrode Ecom is employed for the liquid crystal layer 140.

As shown in FIG. 10($a$), liquid crystal molecules 140$a$ of the liquid crystal layer 140 take the spray alignment when a voltage is not supplied between the pixel electrode for display Dpix and the opposing electrode Ecom. Consequently, in order to shift to the bend alignment, a high voltage of about several ten volts is supplied between the pixel electrode for display Dpix and the opposing electrode Ecom when the power is turned on. For carrying out surely the phase transition, a voltage of reverse polarity is written sequentially into every neighboring horizontal pixel line when the high voltage is supplied. Thereby core formation is carried out upon giving a transversal twisted potential difference between the neighboring pixel electrode for display Dpix and the opposing electrode Ecom, and phase transition is carried out around the core. The spray alignment state is transferred to the bend alignment state by executing such action for about 1 sec., and furthermore the potential difference between the pixel electrode for display Dpix and the opposing electrode Ecom is set to be the same potential so as to erase undesirable hysteresis once.

After the liquid crystal layer is transferred to the bend alignment state like the above, a voltage higher than a low off-voltage Voff is supplied to the liquid crystal molecules 140$a$ to maintain the bend alignment state while it is operated as shown in FIG. 10($b$). Upon varying the voltage in the range between the off-voltage and the on-voltage higher than the off-voltage, alignment state is changed between FIG. 10($b$) and FIG. 10($c$) and the retardation value of the liquid crystal layer 140 is changed by λ/2 to control the transmittance.

To achieve such operation, absorption axes Aa and Ab of a pair of polarization plates 220$a$ and 220$b$ are arranged to be orthogonal together and shifted from the rubbing directions Ra, Rb by π/4 in order to become the black display when the on-voltage is applied as shown in FIG. 9.

A front hybrid phase difference plate 200$a$ and a rear hybrid phase difference plate 200$b$ stuck between the outer surfaces of the array substrate 120 and the opposing substrate 130 and the polarization plates 220$a$, 220$b$ compensate the retardation value RLCon (e.g. 80 nm) of the liquid crystal layer 140 when on-voltage is applied (in the black display), and moreover prevent undesirable leak of light from the front and oblique directions in the black display. Namely, the discotic liquid crystal constituting the hybrid phase difference plates 200$a$, 200$b$ is an optically negative material whose refractive indices nx and ny are the same and whose refractive index nz in the optical axis is smaller than nx, ny. As shown in FIG. 3 and FIG. 9, the molecular optical axis Dopt tilts in the reverse direction to the oblique direction of the optical axis of the liquid crystal molecules 140$a$ of the liquid crystal layer 140. The liquid crystal is so constituted that the tilting angle varies gradually in the direction of film thickness, and the retardation values RD are −40 nm. Therefore, because the retardation value RLCon of the liquid crystal layer 140 is 80 nm in the black display, phase difference in the black display is compensated and thereby undesirable leak of light can be prevented.

Between the hybrid phase difference plates 200$a$, 200$b$ and the polarization plates 220$a$, 220$b$, double-axial phase difference plates 210$a$, 210$b$ are provided respectively. The double-axial phase difference plates 210$a$, 210$b$ prevent leak of light caused by the optical rotatory property of the liquid crystal layer 140 in an oblique direction, and absorption axes Aa, Ab of the polarization plates 220$a$, 220$b$ are coincided with the slow axis Ad. In consequence, the phase difference from the front direction can be approximately zero by combination with the polarization plates 220$a$, 220$b$, so that only wavelength dispersion in an oblique direction can be selectively improved.

<Structure of the Backlight>

Referring to FIG. 11, a backlight 300 located facing the polarization plate 220$b$ will be explained.

The backlight 300 is comprised of a plurality of tubular light sources 310 arranged in parallel together as shown in, for example, FIG. 11($a$), a resin reflector 320 accommodating the tubular light sources 310 and emitting effectively the light from the tubular light sources 310 in the front direction, and an optical sheet located between the polarization plate 220$b$ (Refer to FIG. 2) and the tubular light sources 310.

The optical sheet comprises a diffusion plate 340 of e.g. TDX of Asahi Kasei Co. for assuring brightness uniformity, and prism sheets 350, 360 of e.g. BEFIII of 3M Inc., which has a plurality of prism rows condensing the light emitted from the tubular light sources 310.

The tubular light source 310 is constituted of a lamp of high color rendering property represented by the three-wavelength cold cathode fluorescent tube having, for example, the luminous spectrum, which has a red light region with a peak at 610 nm, a green light region with a peak at 540 nm and a blue light region with a peak at 435 nm, as shown by the curve A of FIG. 17. $Y_2O_3$:Eu fluorescent material for red, $LaPO_4$:Ce,Tb fluorescent material for green and BAM fluorescent material for blue are used as the fluorescent material excited by a ultraviolet ray of 147 nm in the case of employing xenon gas as the discharge gas of the lamp. However, other fluorescent materials are used in many cases. There is not a great difference between them as the luminous spectrum to obtain a high color rendering property.

Respective color filter layers CF(R), CF(G), CF (B) of the liquid crystal have the passing property C, the red filter layer CF(R) having the passing property of 580 nm or more represented by CR, the green filter layer CF(G) having the passing property of 510 to 580 nm represented by CG, and the blue filter layer CF(B) having the passing property of 400 to 550 nm represented by CB. Namely, the sharp peak of 435 nm, the low and wide peak of 450 nm, and the low and sharp peak of 490 nm of the spectrum of the lamp are included in the passing region of the blue filter CF(B).

FIG. 11(b) is a variant example of this embodiment, in which a side light type surface light is employed as the backlight. This variant example is comprised of a light guide plate 370 formed by such as acryl resin, tubular light sources 310 arranged on the side of the light guide plate 370, reflectors 380 guiding effectively the light from the tubular light source 310 to the light guide plate 370, a blue green light absorber 330 arranged on the emitting surface of the light guide plate 310, and prism sheets 350, 360 arranged thereon.

In addition to reduction of the reflectance of the opposing electrode of this embodiment, the blue green light absorber 330 is arranged for the backlight. The blue green light absorber 330 absorbs at least a portion of the spectral region of blue green. As shown by the curve B of FIG. 16, the absorption characteristic shows the absorption rate of 30% or more at the wavelength range of 450 to 470 nm. Undesirable light leakage can be more prevented as the absorption rate becomes higher. The curves C are the characteristics of the color filters of the liquid crystal panel 100, which contains the filter characteristics of red CR, green CG and blue CB.

As shown in FIG. 17, the spectral radiation brightness in the black display shows the characteristic when the absorber is formed by a blue green light absorbing glass plate, showing the brightness remarkably decreases in the region when the absorbing glass plate exists. In this figure, D shows the characteristic with the absorbing glass, and A shows the characteristic without the absorbing glass. Any tinge of blue in the black display can be further reduced by absorbing the light in the blue green region by the absorber.

FIG. 11(c) is another variant example of this embodiment, having the same structure as FIG. 11(b) except that the located position of the blue green absorber 330 is changed between the tubular light source 310 and the light guide plate 370. Such structure has an advantage that can make the device small compared to the embodiment and the variant example described heretofore.

The lamp envelope itself constituting the tubular light source 310 can also be formed by blue green light absorbing glass instead of the embodiments and the variant examples mentioned above.

<Display Operation>

In accordance with the structure mentioned above, the light emitted from the tubular light source 310 passes through the polarization plate 220b on the light passage L as shown in FIG. 9. Here, only the polarized light having passed the transmission axis orthogonal to the absorption axes Aa, Ab of the polarization plate 220b is emitted, and enters into the liquid crystal display cell 110 through the rear double-axial phase difference plate 210b and the rear hybrid phase difference plate 200b.

Because the summed retardation of the liquid crystal layer 140 and the whole phase difference plates is approximately zero in the normal direction at on-voltage, the polarized light passes through as it is, and reaches the polarization plate 220a of the front side. The polarization plates 220a, 220b are positioned in the crossed-Nicol configuration alignment, so that the polarized light is absorbed by the front polarization plate 220a. Therefore the polarized light is cut off and the black display can be obtained.

As the retardation of the liquid crystal layer 140 varies in accordance with voltage supplying condition between the on-voltage and the off-voltage and thereby difference from the retardation of the whole phase difference plates varies, the incident light emitted from the front two-axes phase difference plate 210a becomes ecliptic polarization and reaches the front polarization plate 220a, so that the light passes through in accordance with the polarization condition. As mentioned above, gradation display can be done upon varying the applied voltage.

As reflection of the opposing electrode is decreased, a light due to multi internal reflection of the liquid crystal layer is diminished. A light deviated off the predetermined retardation value of the liquid crystal display cell is decreased so that outstanding tinges of blue in the black display can be mitigated.

Embodiment 2

FIG. 12 shows the liquid crystal display cell 110 of the embodiment 2 of the present invention, having the same structure as FIG. 2 except that the structure of the opposing electrode Ecom is different from the structure explained by FIG. 2.

The opposing electrode Ecom of this embodiment has a uniform thickness regardless of each color filter layer, and the thickness is set to have the minimum value of the front reflectance at the range of blue region of 380 to 480 nm of the spectrum. Although it is needless to say that the optimum value should be designed at the place corresponding to the blue pixel in view of diminishing a tinge of blue, it is necessary that the thickness should not generate any deficiencies such as the contrast-deterioration also in the green pixel and the red pixel if the thickness of the opposing electrode is formed uniformly.

Specifically, the thickness in the case of indium tin oxide film of the refractive index 1.9 is set to be 116 nm when the front reflectance at the spectrum of 440 nm is the minimum. It is necessary that the thickness should be thinner in order to shift the spectrum for the minimum value of the reflectance toward the short wavelength side. Thereby, the electrical resistivity of the film tends to be increased. However, if the thickness is in the extent suitable for the blue region of this embodiment, there is practically no problem. This embodiment has an advantage that manufacturing process thereof becomes simple because the film with a uniform thickness is formed.

It is desirable that tB should beset in the following range:

100 nm<tB≦140 nm, where tB denotes the thickness of the blue region of the opposing electrode. Light leakage of the red and green region increases if the thickness is 100 nm or less and deficiency of contrast-deterioration is generated. Light leakage of the blue region increases if the thickness is greater than 140 nm and a tinge of blue in the black display is increased. It is further desirable that the tinge of blue in the black display can be mitigated when the thickness is set within the range of 100 nm<tB<130 nm.

Embodiment 3

FIG. 13 shows an embodiment of the reflective type liquid crystal display device of OCB mode. Any portion denoted by the same mark as FIG. 9 shows the same portion, so that the explanation thereof will be omitted.

In addition, retardation is considered that the liquid crystal display cell is a reflective type. The birefringence anisotropy of liquid crystal material or the cell gap is adjusted so that the retardation is set to ½ of the above-mentioned embodiment.

For this reflective type liquid crystal display device 2, it is sufficient for the polarization plate that a sheet of the polarization plate 220a is placed at the front side. On the other hand, the reflection plate 160 is located at the rear side of the liquid crystal display cell 110. The natural light incident on the polarization plate 220a becomes a linearly polarized light with a component of the passing axis Ta of the polarization plate 220a. The light passes through the double axial phase difference plate 210a, the front hybrid phase difference plate 200a, and the liquid crystal display cell 110, and is reflected by the reflection plate 160, then returns via the return path with the phase reversed and shifted by 90 degrees, and finally reaches the polarization plate 220a again. If the light does not receive any phase differences due to each element during the travel, the linearly polarized light is absorbed by the polarization plate 220a and becomes the black display. If the light becomes an elliptically polarized light by changing the retardation of the liquid crystal display cell 110, a portion of the returned light passes through the polarization plate 220a and enables the gradation display. Because the light passes through each element twice, it is necessary as mentioned above that the thickness and the retardation should be regulated to fit it.

The opposing electrode Ecom formed on the inside surface of the opposing substrate 130 has the same structure as the embodiment 1, i.e. the thickness thereof is set to be different from each other for every color filter layer. Thereby, internal reflection in the liquid crystal display cell decreases and occurrence of the blue image in the black display can be mitigated.

EXPLANATION OF THE MARKS

Figure 1:
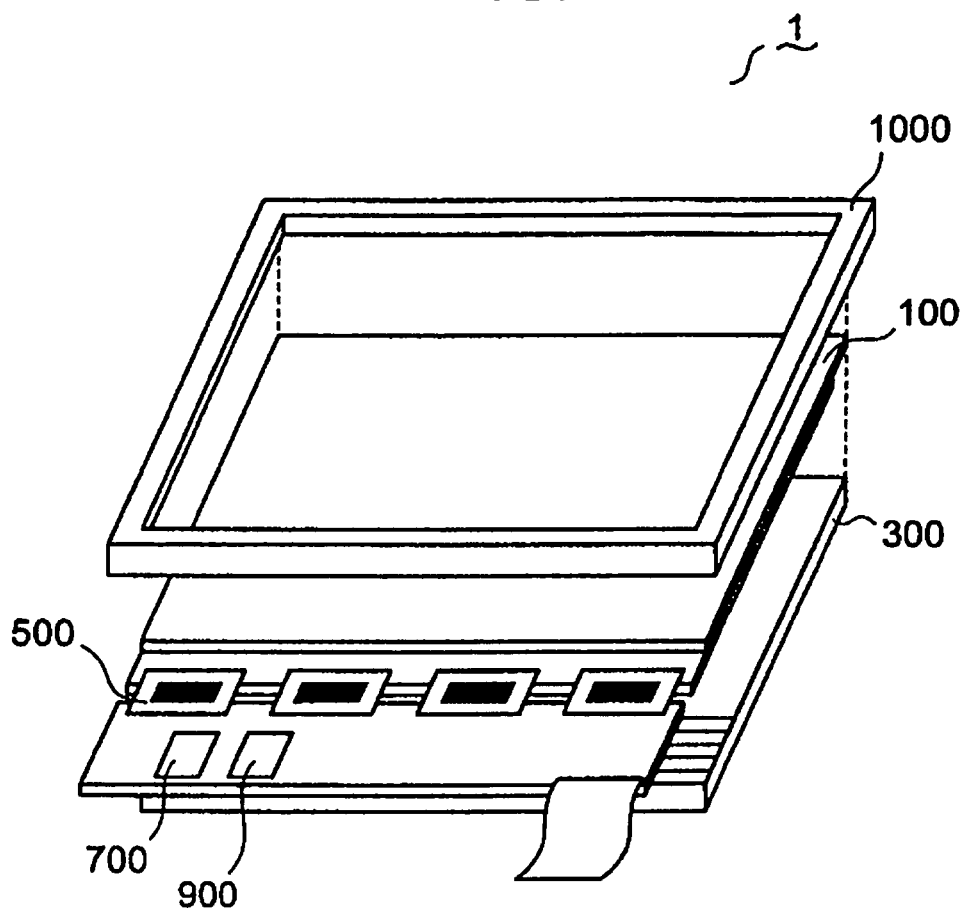
FIG. 1 is a schematic block diagram of the liquid crystal display device according to the embodiment 1 of the present invention.
Figure 2:
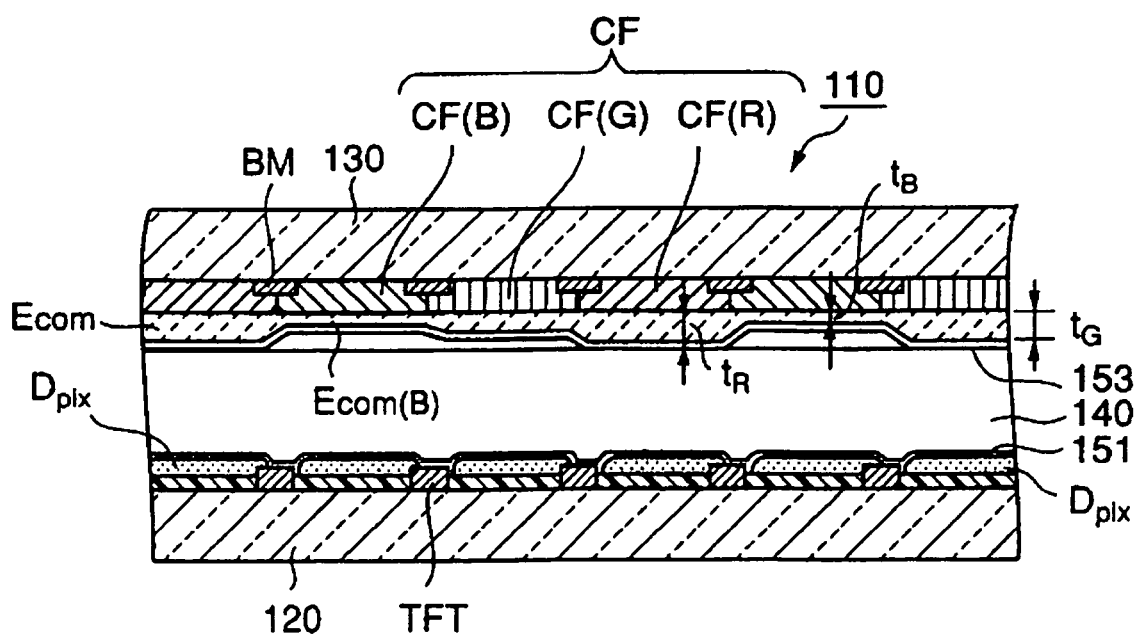
FIG. 2 is a partial cross-sectional view of the liquid crystal display cell according to the embodiment 1.
Figure 3:
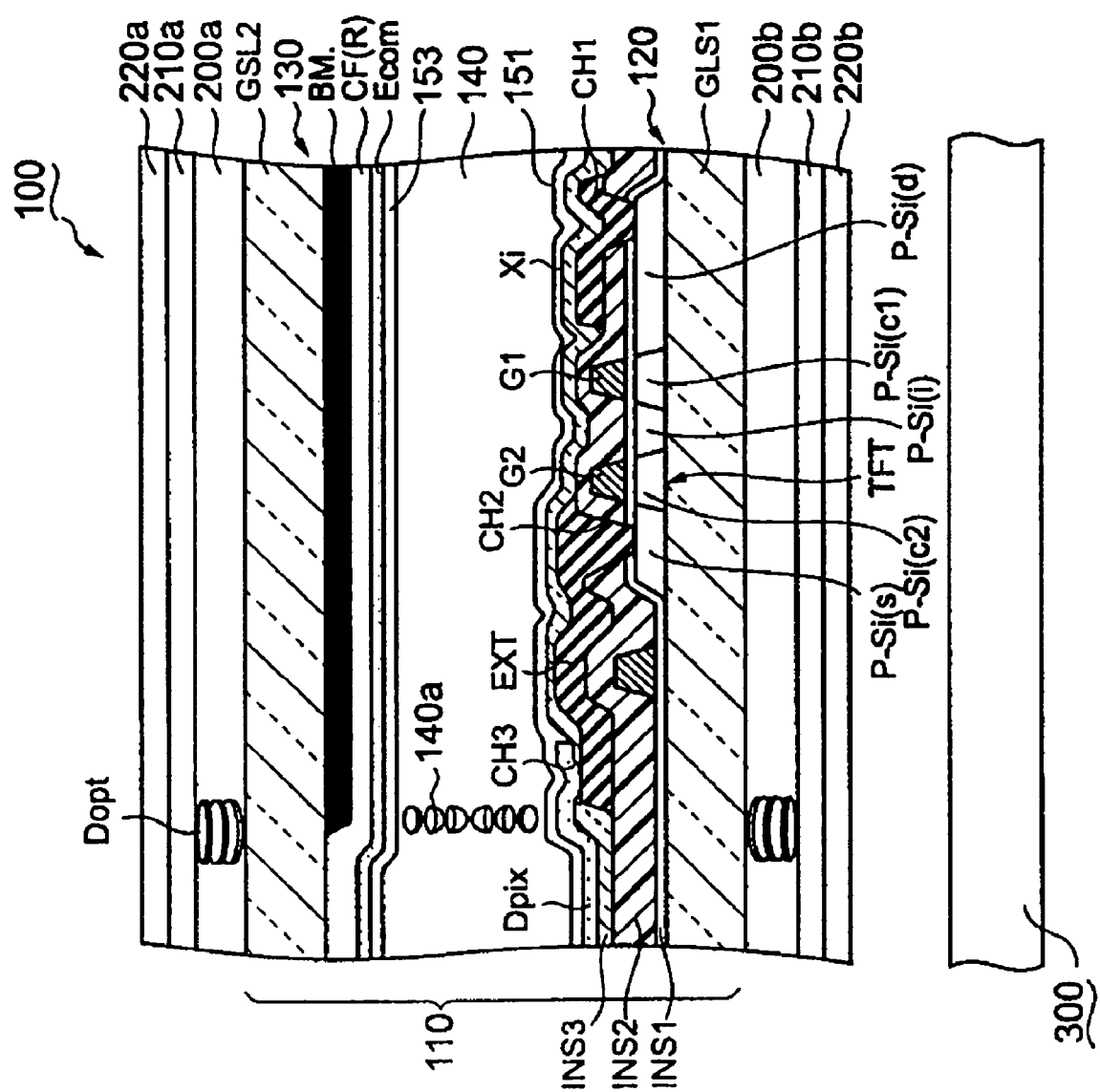
FIG. 3 is an enlarged partial cross sectional view of the liquid crystal display cell according to the embodiment 1.
Figure 4:
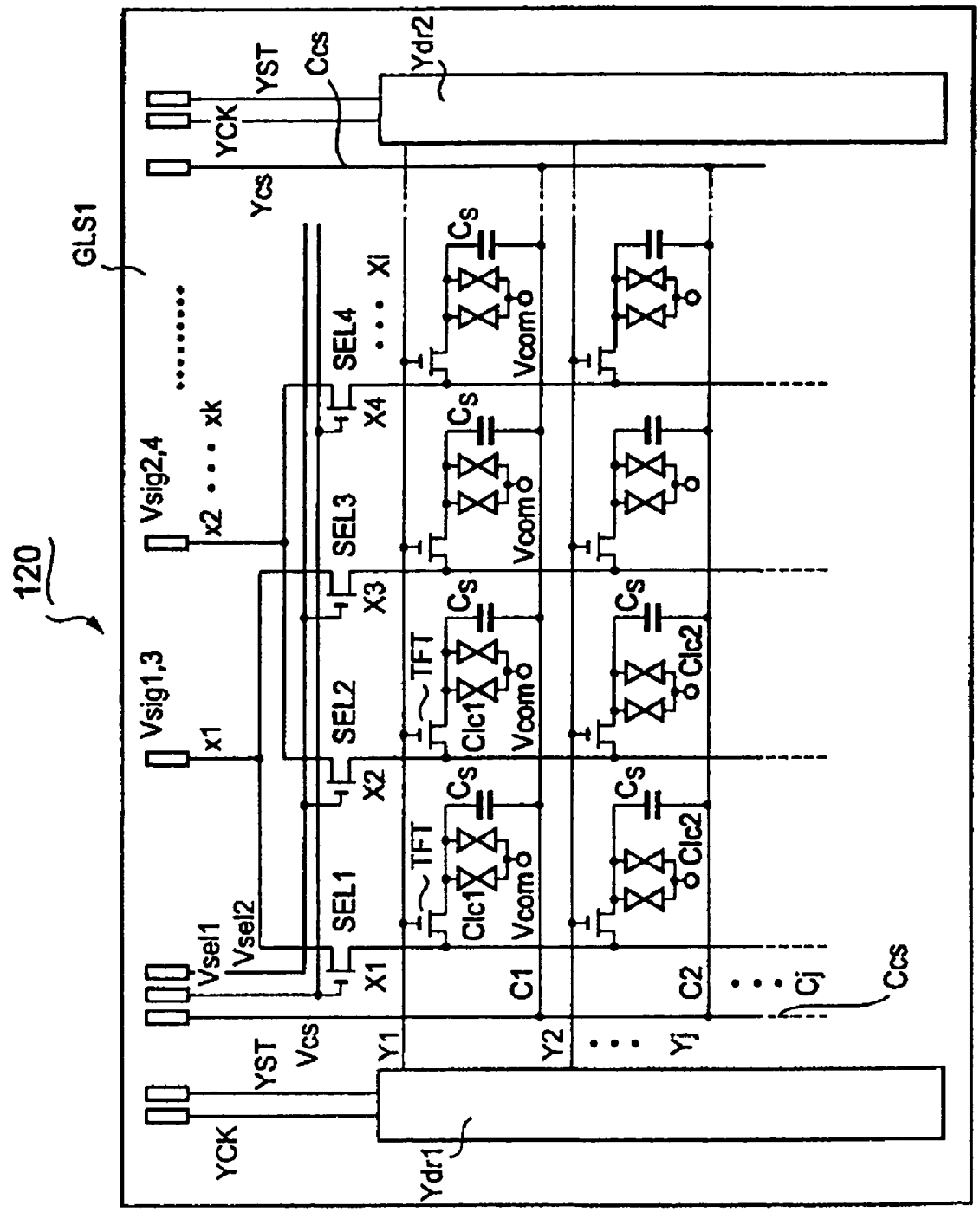
FIG. 4 is a schematic equivalent circuit diagram of the liquid crystal display cell according to the embodiment 1.
Figure 5:
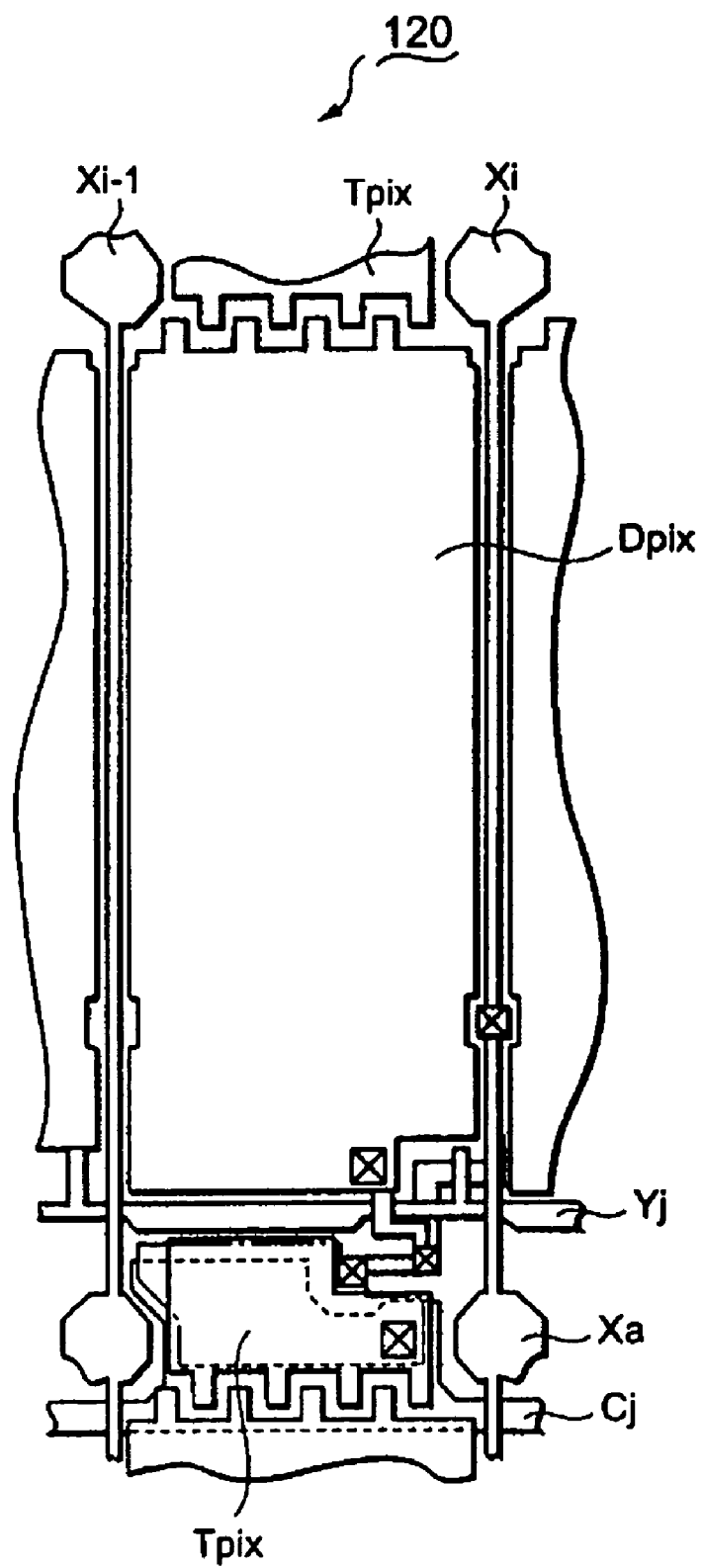
FIG. 5 is a partial schematic front view of the array substrate according to the embodiment 1.
Figure 6:
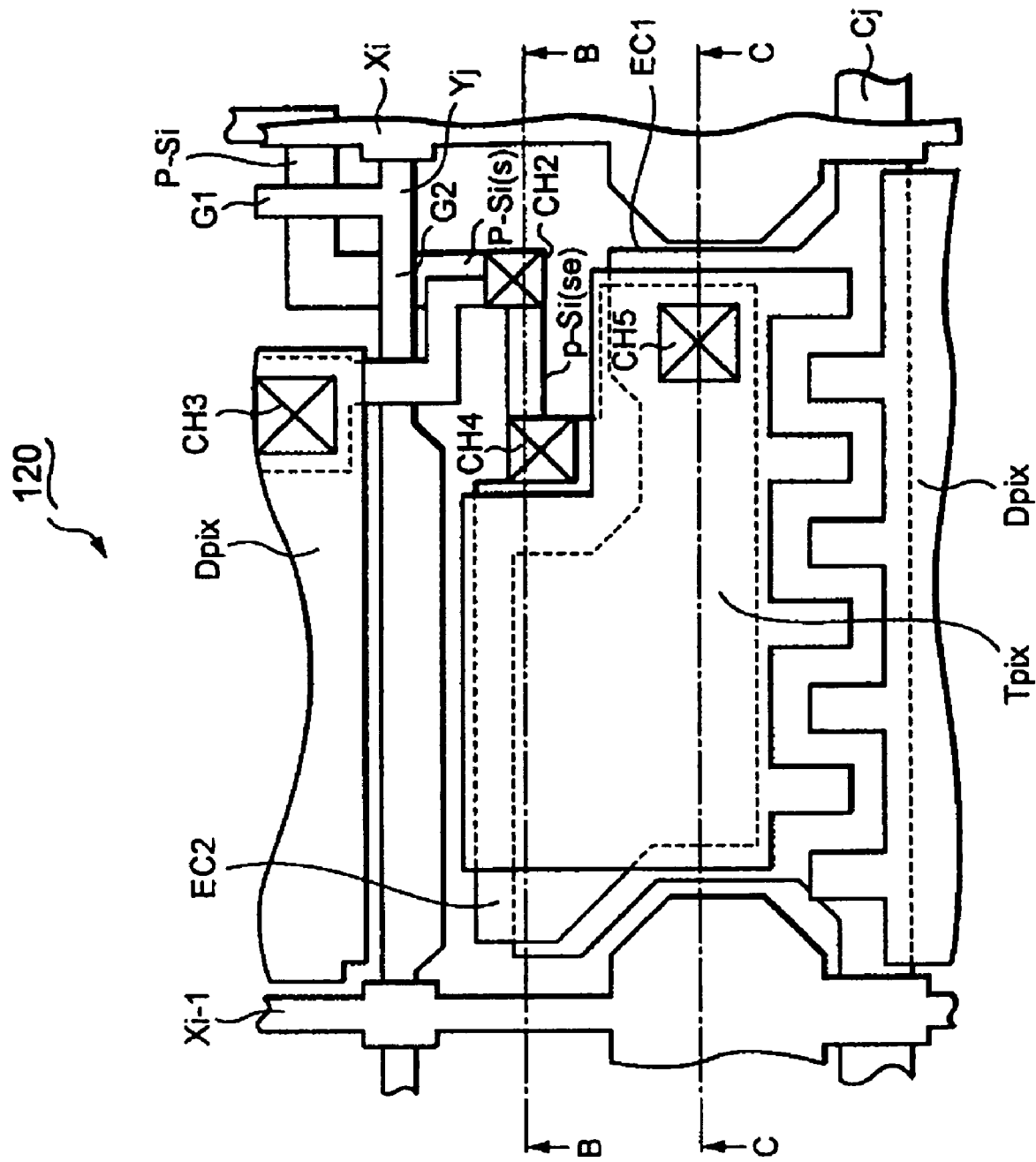
FIG. 6 is a partial schematic front view of the array substrate according to the embodiment 1.
Figure 7:
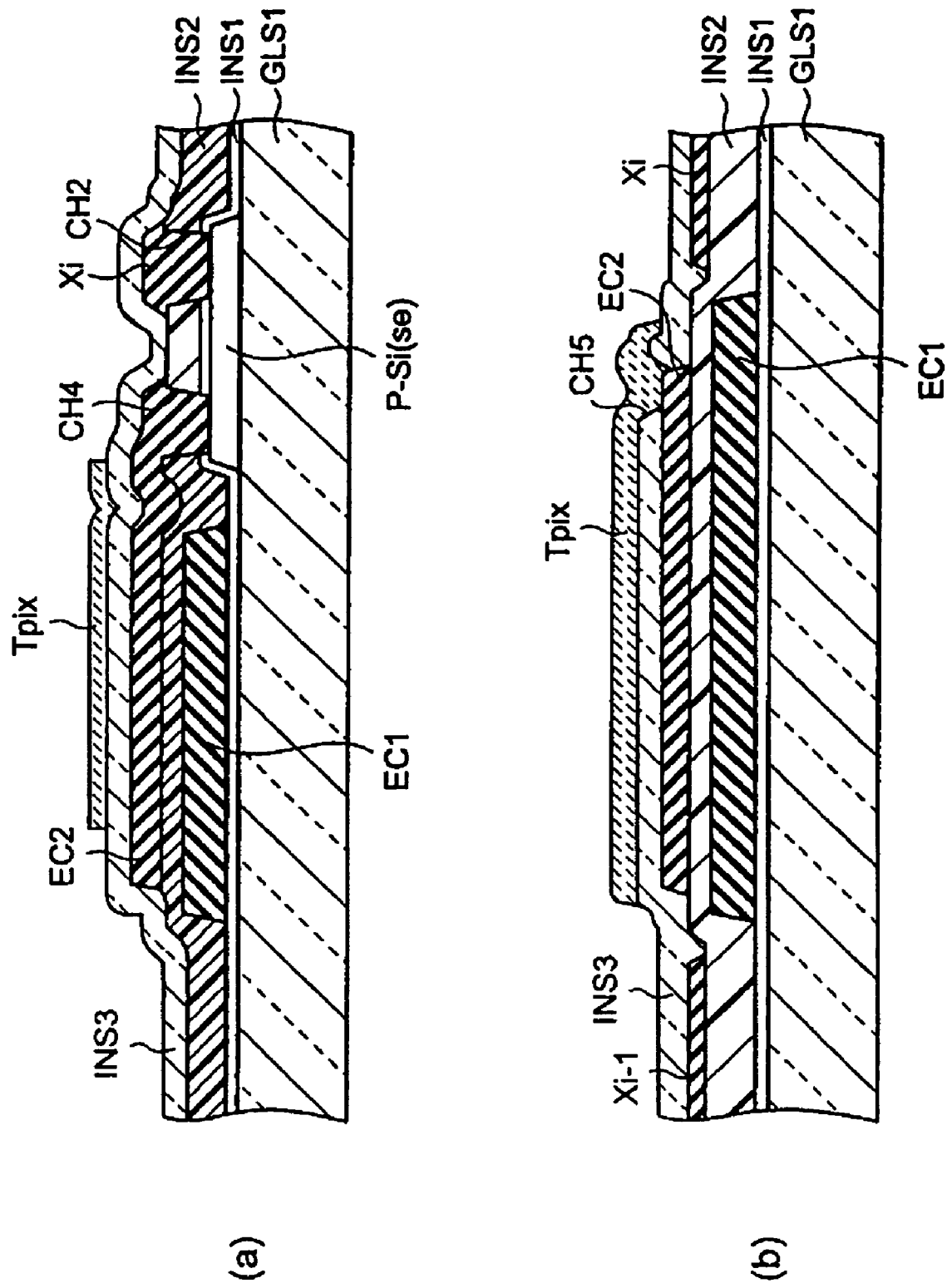
FIG. 7(a) is a partial schematic cross sectional view of the array substrate cut along B-B line in FIG. 6
FIG. 7(b) is a partial schematic cross sectional view of the array substrate cut along C-C line in FIG. 6.
Figure 8:
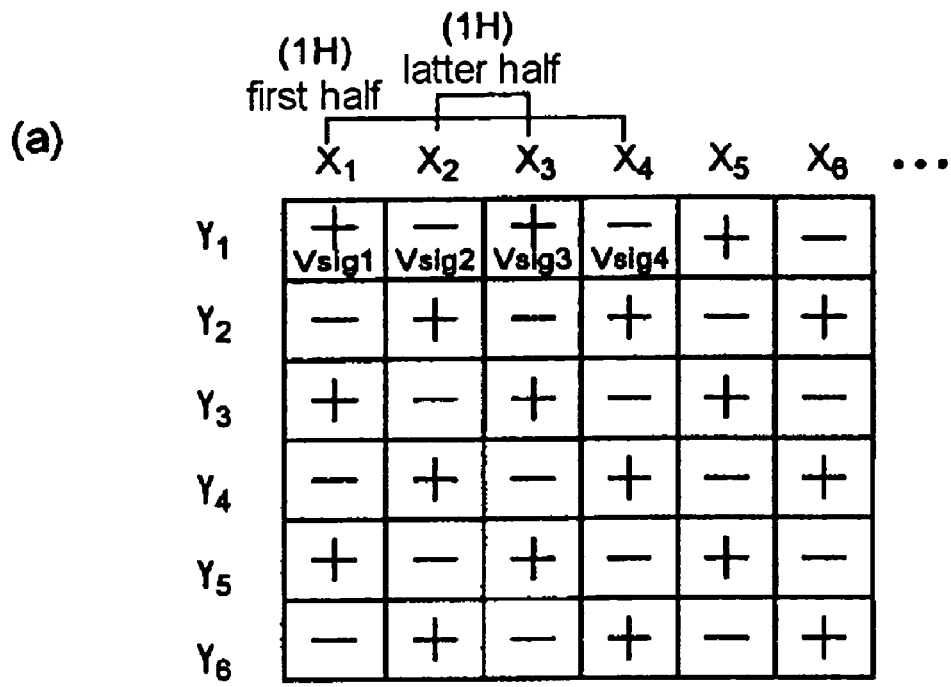
FIG. 8(a) and FIG. 8(b) are diagrams explaining the displaying conditions of an embodiment.
Figure 8:
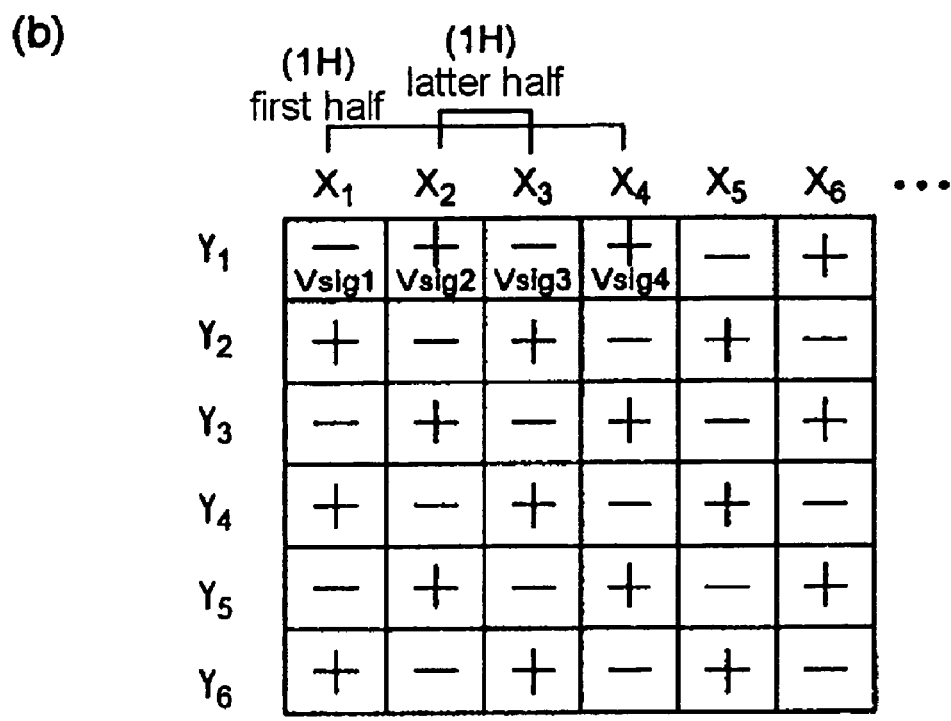
Figure 9:
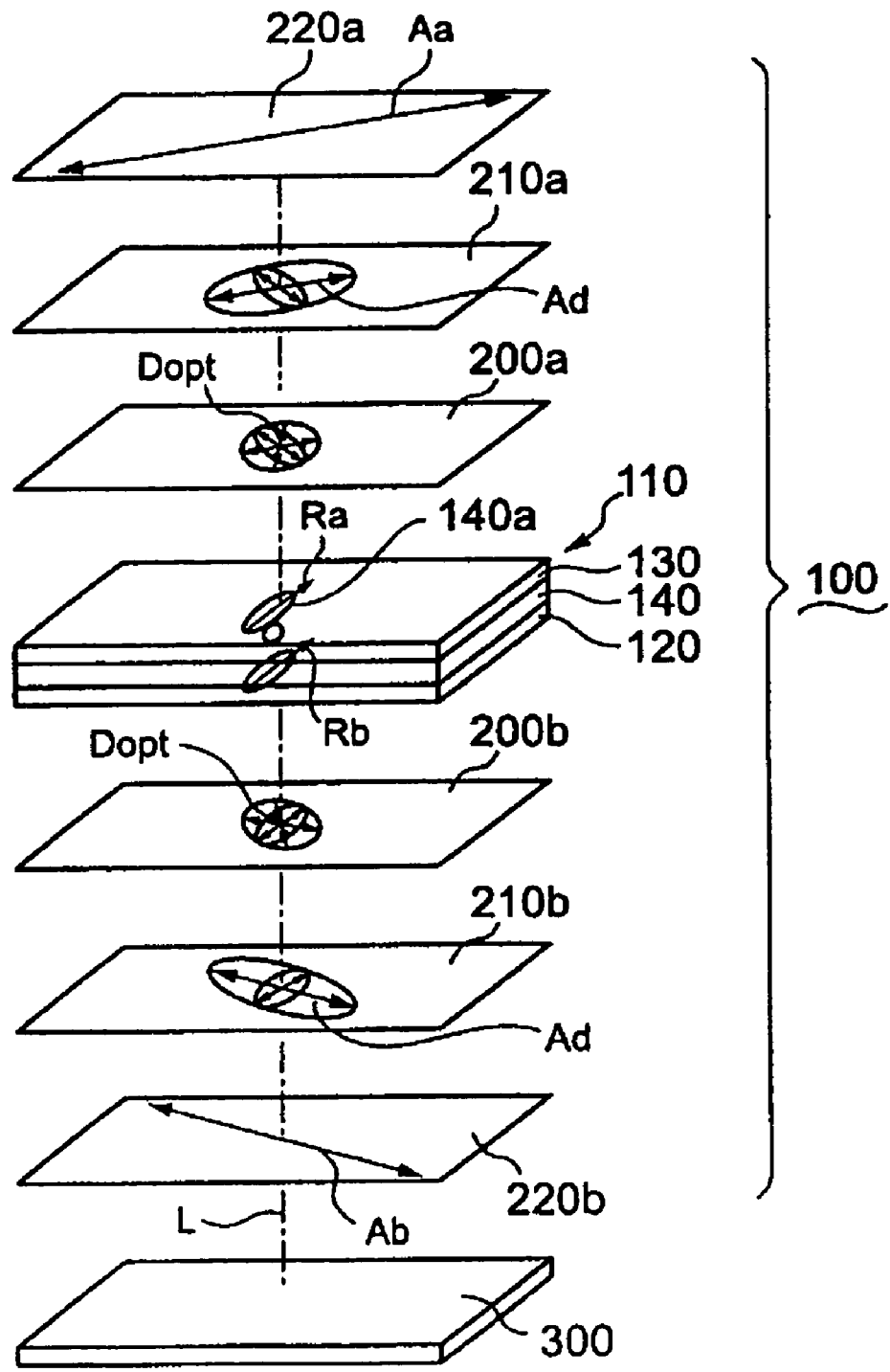
FIG. 9 is a schematic block diagram of the liquid crystal display cell according to an embodiment.
Figure 10:
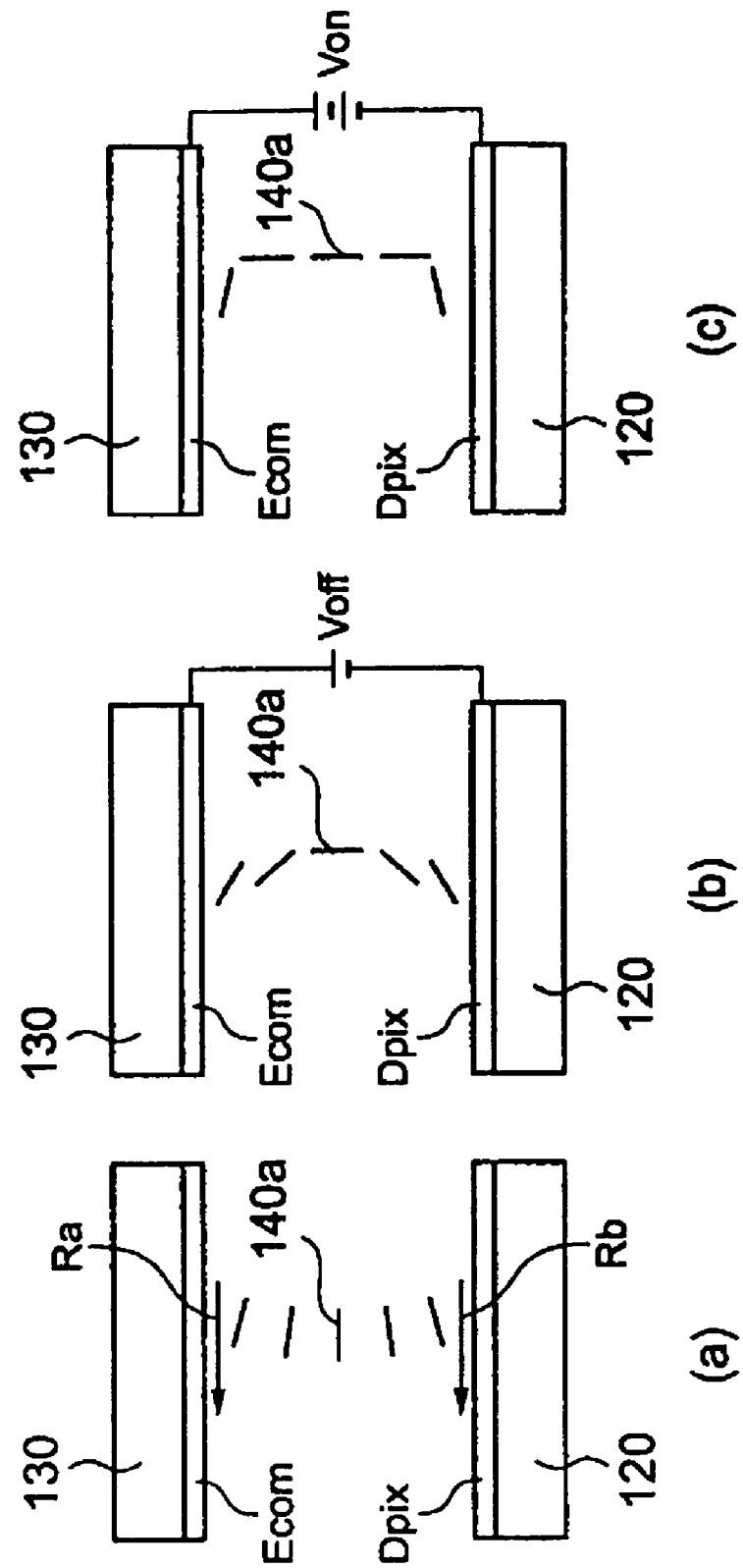
FIG. 10(a), FIG. 10(b) and FIG. 10(c) are schematic diagrams explaining operation of the embodiment 1.
Figure 11:
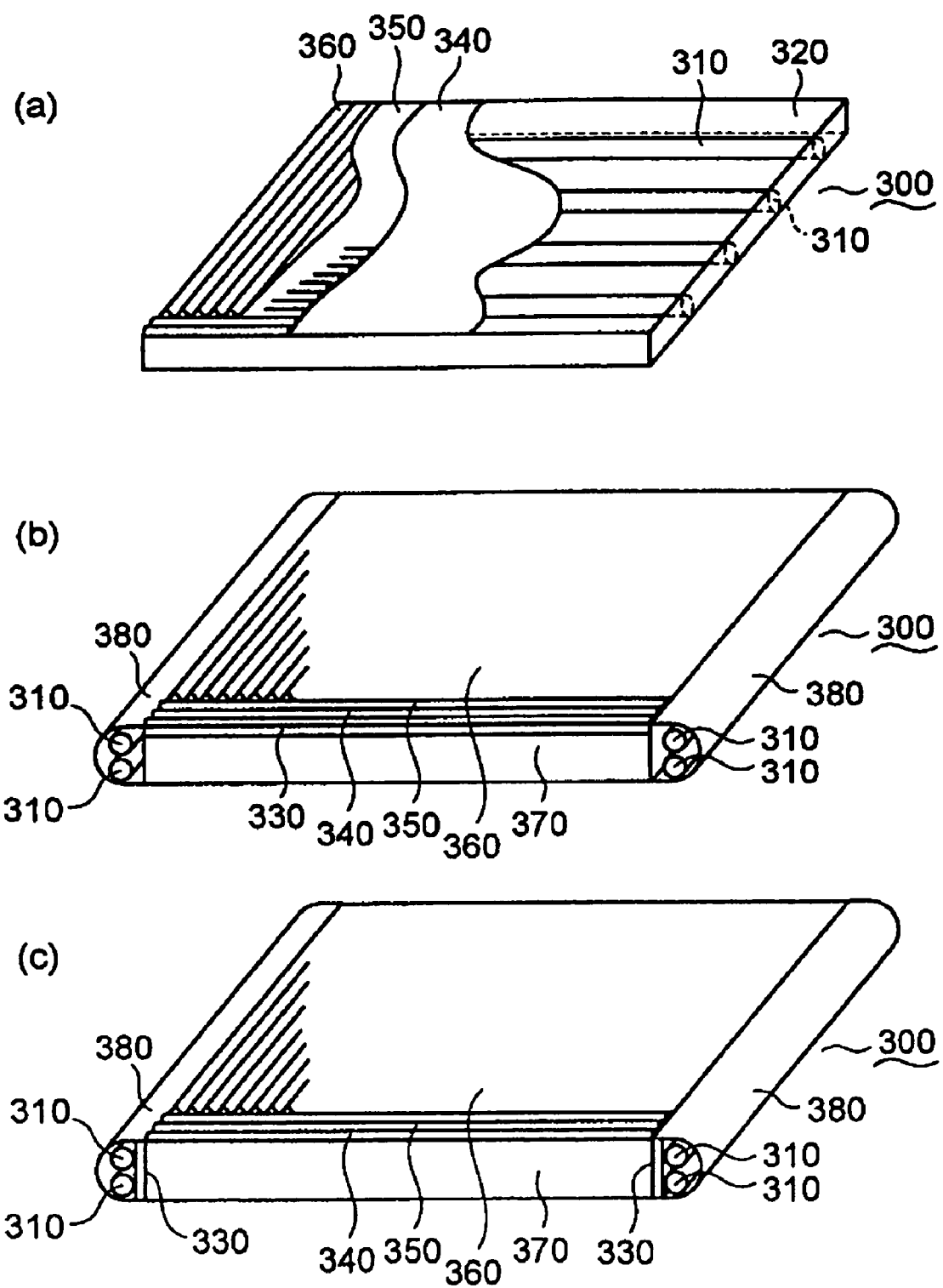
FIG. 11(a), FIG. 11(b) and FIG. 11(c) are schematic cross sectional views of the backlight according to the embodiment 1.
Figure 12:
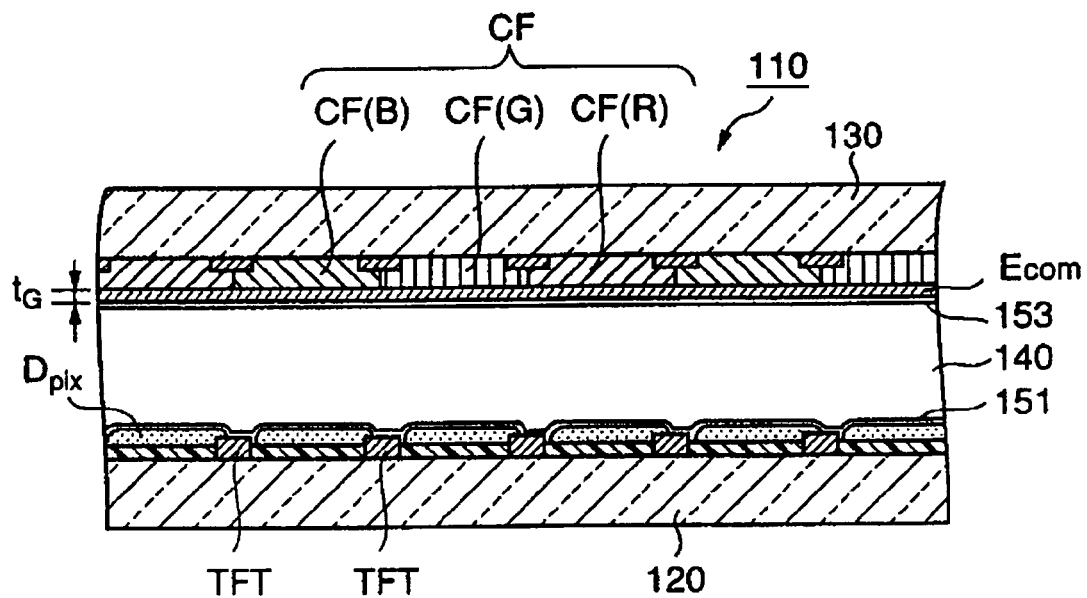
FIG. 12 is a partially cut cross sectional view of the embodiment 2 of the present invention.
Figure 13:
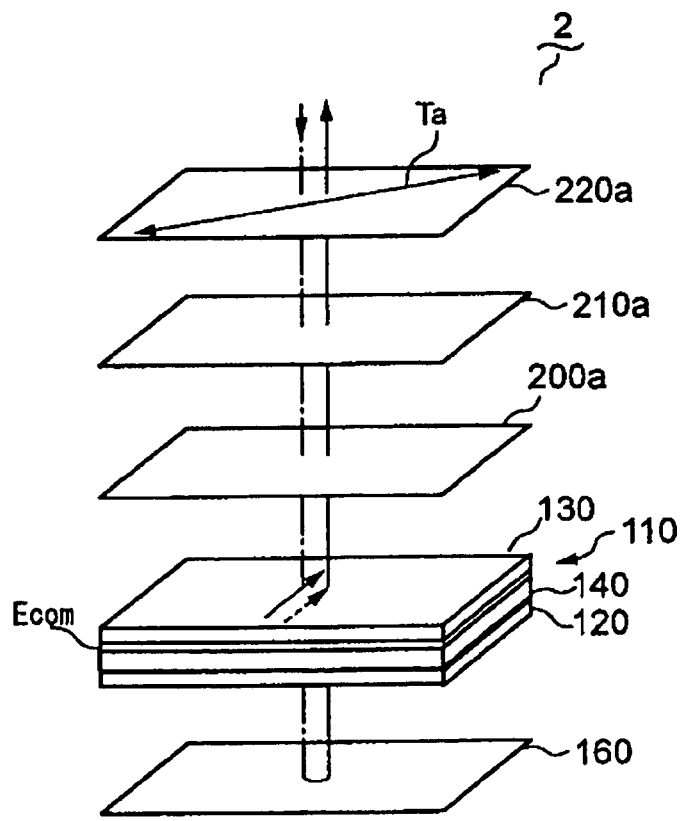
FIG. 13 is a schematic block diagram of the liquid crystal display cell according to the embodiment 3 of the present invention.
Figure 14:
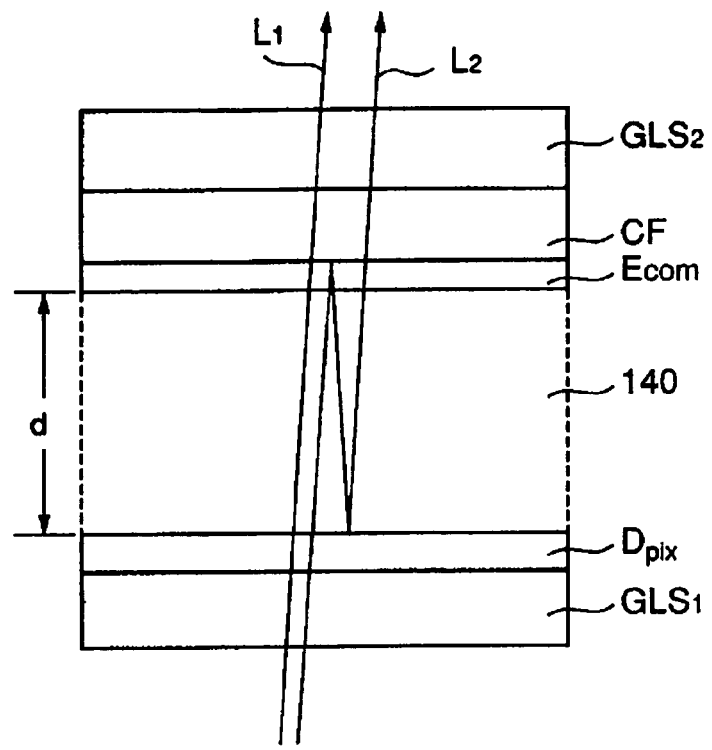
FIG. 14 is a schematic diagram explaining the operation of the present invention.
Figure 15:
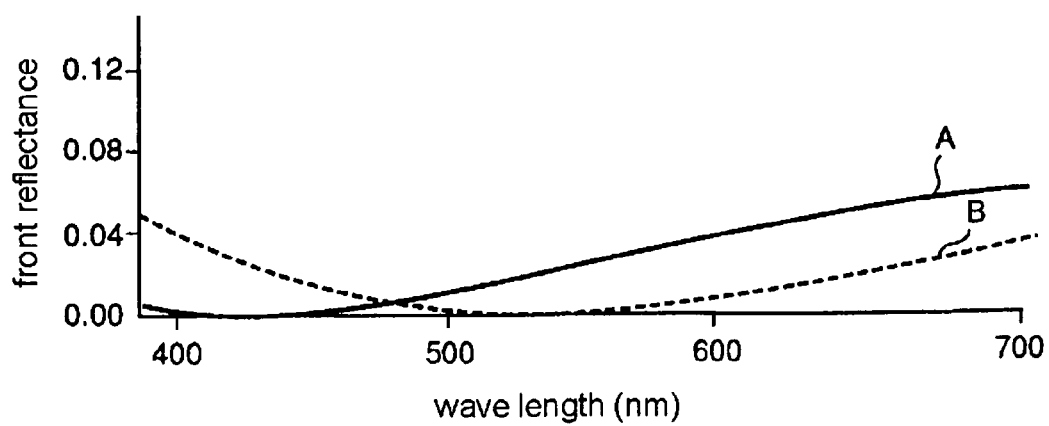
FIG. 15 is a diagram of curves explaining the front reflectance of the opposing electrode of the embodiment 1.
Figure 16:
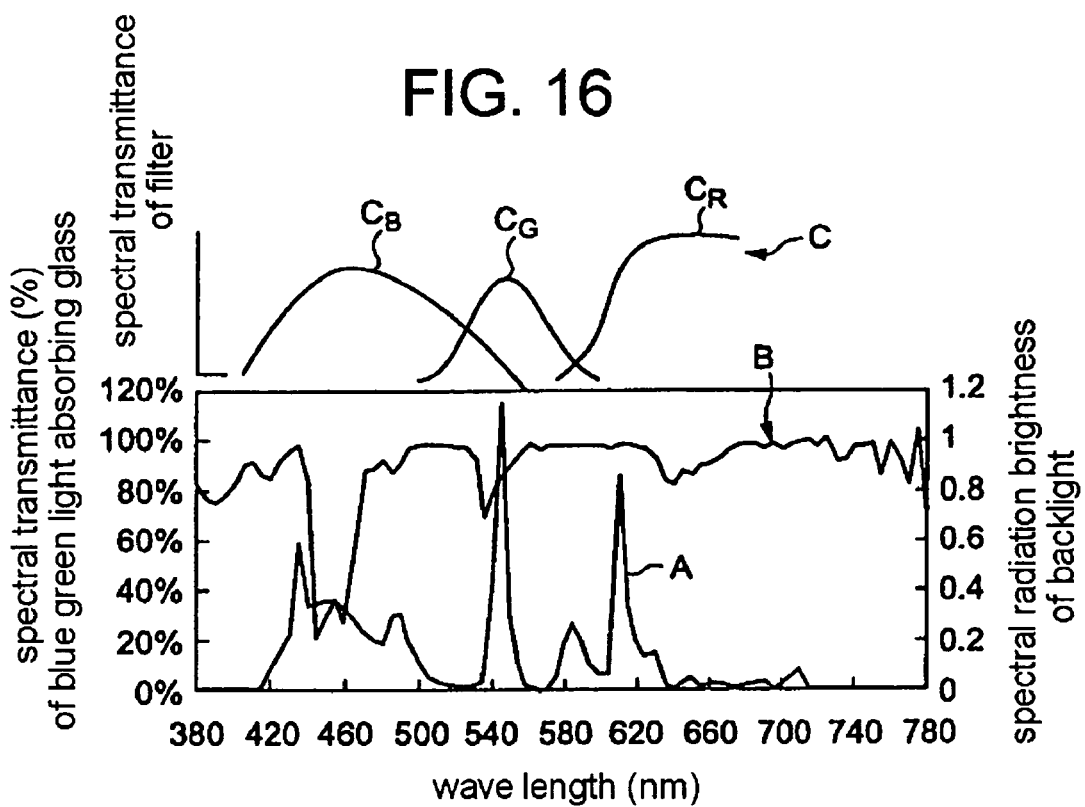
FIG. 16 is a diagram of curves explaining the spectral radiation brightness characteristics of the backlight lamp, the absorbing characteristics of the blue green absorber and the passing characteristics of the red, green and blue color filters.
Figure 17:
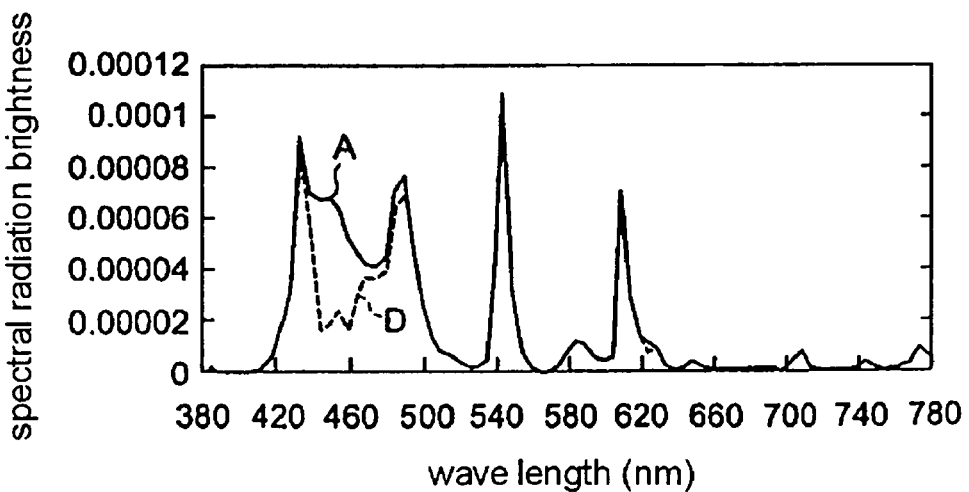
FIG. 17 is a diagram of curves showing the spectral radiation brightness characteristics in the black display.

110: liquid crystal display cell
120: array substrate
130: opposing substrate
CF(R), CF(G), CF(B): red, green and blue filter layers
140: liquid crystal layer
200a, 200b: hybrid phase difference plate
210a, 210b: double axis phase different plate
220a, 220b: polarization plate
300: back light
Ecom: opposing electrode
TFT: switching element

What is claimed is:

1. An optically compensated birefringence (OCB) mode liquid crystal display cell comprising
an array substrate having a plurality of pixel electrodes and switching components connected to each pixel electrode arranged in a matrix form on a main surface thereof,
an opposing substrate having an opposing electrode which has a uniform thickness and is located so as to face the array substrate with a gap between them,
color filters comprising red, green and blue filter layers formed corresponding to the pixel electrodes on one of the substrates, and
a liquid crystal layer arranged in a bend alignment interposed between the array substrate and the opposing substrate,
wherein
wherein minimum value in spectrum of front reflectance of a portion of the opposing electrode corresponding to the blue filter layer is between 380 nm and 480 nm, thickness of the opposing electrode corresponding to the blue filter layers is equal to that of the red and green filters, and thickness of the opposing electrode t is confined to 100 nm<t≦140 nm.

2. The OCB mode liquid crystal display cell as described in claim 1, wherein the opposing electrode is located between the color filters and the liquid crystal layer.

3. The OCB mode liquid crystal display cell as described in claim 1, wherein the opposing electrode is formed by indium tin oxide (ITO) film.

4. The OCB mode liquid crystal display cell as described in claim 1, wherein the liquid crystal display cell comprises
a phase difference plate located on at least one of main surfaces of the liquid crystal display cell, and
a polarization plate located on at least one of main surfaces of the liquid crystal display cell so as to interpose the phase difference plate between the polarization plate and the liquid crystal display cell.

5. The OCB mode liquid crystal display cell as described in claim 1, wherein the liquid crystal display cell further comprises a backlight located on an outer surface of the array substrate.

6. The OCB mode liquid crystal display cell as described in claim 1, wherein the backlight comprises a light source, and a blue green absorber for absorbing at least a portion of the spectral region of blue green.

7. The OCB mode liquid crystal display cell as described in claim 1, wherein the thickness of the opposing electrode t is confined to 100 nm<t<130 nm.

* * * * *